March 17, 1964 R. W. SCHUMANN 3,125,721
PULSE HEIGHT ANALYZER INCLUDING DIGITAL STORAGE
MEANS AND METHOD OF CLASSIFYING
AND COUNTING PULSES
Filed Aug. 29, 1961
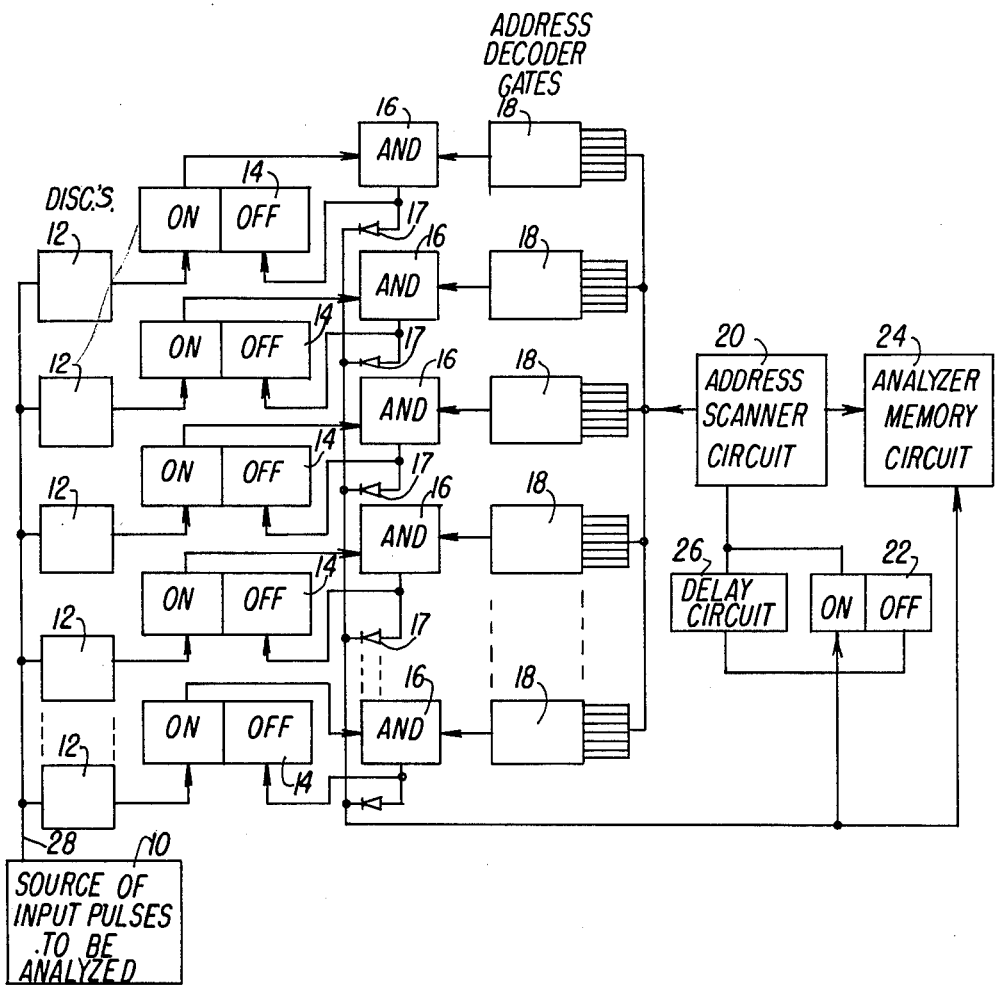
INVENTOR.
ROBERT W. SCHUMANN
BY
Byron, Hume, Groen, & Clement
ATTYS.

United States Patent Office 3,125,721
Patented Mar. 17, 1964

3,125,721
PULSE HEIGHT ANALYZER INCLUDING DIGITAL STORAGE MEANS AND METHOD OF CLASSIFYING AND COUNTING PULSES
Robert W. Schumann, Madison, Wis., assignor to Nuclear Data, Inc., Madison, Wis., a corporation of Illinois
Filed Aug. 29, 1961, Ser. No. 134,690
7 Claims. (Cl. 324—103)

This invention relates in general to a pulse height analyzer, and, in particular, to an improved high speed pulse height analyzer.

Pulse height analyzers have taken two general forms: one being the discriminator type wherein the input pulses to be analyzed are presented to an array of amplitude sensing circuits that determine individually whether the presented pulses satisfy the conditions of amplitude corresponding to the setting of each individual amplitude sensing circuit. One, and only one, of the array of amplitude sensing circuits then accepts each individual input pulse. The number of pulses, which are accepted by each amplitude sensing circuit, are then counted so as to provide the pulse height distribution analysis desired; the other general type of pulse height analyzer performs an analog to digital conversion of each input pulse to be analyzed and thereafter uses computer techniques for storage of the information.

Each general type of pulse height analyzer has certain advantages over the other. The use of computer techniques makes possible the ready use of such convenient data readout methods as electric typewriters, oscilloscope displays, pen recordings and so forth. There are fewer adjustments required using the analog to digital conversion type of pulse height analyzer and the analog to digital type is less expensive to manufacture than the discriminator type.

A very important attribute of the discriminator type is the high speed at which each individual pulse may be analyzed. An individual pulse may be processed for example, in the discriminator type, in a period which is one hundred times shorter than the processing time required using the analog to digital conversion type pulse height analyzer. In some situations, high speed pulse height analysis is entirely necessary.

A hybrid type of pulse height analyzer has been proposed, which combines an array of amplitude sensing circuits each corresponding to a predetermined amplitude range with an accumulating computer. Each input signal pulse is accepted by the proper amplitude sensing circuit and the accumulating computer then searches for the proper corresponding address and stores the count in the analyzer memory circuit. The time lost in performing a digital conversion of the input pulse in the analog to digital conversion type pulse height analyzer is avoided by this method but the process of storage of the count in the corresponding analyzer memory circuit requires a distinct amount of time and this time is generally ten or twenty times as long as is required by the discriminator type pulse height analyzer. This system is faster than the analog to digital conversion type system but it is nevertheless relatively limited in speed. If a burst of signals is received, as is the case when the radiation source is a periodic source, such as a target in the beam of a pulsed particle accelerator, only a few of the signal pulses will be analyzed for the storage of counts requires discreet amounts of time and the amplitude sensing circuits must be inactivated during the storage of these counts.

With the above in mind, it is therefore a general object of this invention to provide an improved high speed pulse height analyzer.

It is another general object of this invention to provide an improved high speed pulse height analyzer that is economical to manufacture.

It is yet another object of this invention to provide an improved high speed pulse height analyzer particularly suitable for analyzing bursts of signals in which many signal pulses occur during a brief period of time followed by an inactive period of time wherein very few, if any, signals occur and of many times the length of the burst time.

It is yet another object of this invention to provide an improved high speed pulse height analyzer wherein incoming pulses are permanently marked until analyzed and stored in the analyzer memory.

It is another object of this invention to provide an improved high speed pulse height analyzer in which pulses of a particular amplitude are counted and stored only in a corresponding memory address and wherein the possibility of such pulses being counted by a different memory address is avoided.

It is yet another object of this invention to provide an improved high speed pulse height analyzer comprised of comparatively simple circuitry that is economical to manufacture, high speed in application especially when handling bursts of signals, and reliable when in use.

Briefly, the illustrated embodiment of the invention comprises a pulse height analyzer having input signals presented thereto for pulse height classification and storage. When a signal pulse is received by the pulse height analyzer, a permanent mark is recorded indicating that a pulse in a predetermined amplitude range or channel has been received. The permanent mark persists until cleared after the commencement of the storage of the count in the memory circuit of the pulse height analyzer. A scanner circuit is provided to sequentially scan all the provided amplitude range circuits or channels and whenever it is discovered that a particular amplitude range circuit or channel has been marked, two information signals are transmitted to the remainder of the pulse height analyzer. One information signal causes the analyzer memory circuit to record that a pulse of a determined height has been received by the pulse height analyzer, and the other information signal instructs the scanner circuit to stop until the received marked input signal has been recorded. As the received and marked input signal is being recorded in the analyzer memory circuit, the marked amplitude range circuit or channel is cleared. The scanner thereafter continues in its sequential progression scanning all the provided amplitude range circuits until another amplitude range circuit is discovered to be marked and the process previously described is repeated.

Other objects, features and advantages of the disclosed invention will be more fully understood if the following is viewed in light of the drawing wherein an embodiment of the invention is schematically illustrated in a block diagram assemblage.

Referring to the drawing wherein a block diagram schematic illustration of an embodiment of the invention is disclosed, there is schematically illustrated a source of input pulses 10 to be analyzed, for example signal pulses originating from a target in the beam of a pulsed particle accelerator. The source of input pulses to be analyzed is connected in parallel to an array of amplitude discriminators 12. The number of amplitude discriminators 12 in the particular array corresponds to the number of amplitude ranges or channels that are desired to be recorded and classified in the pulse height analyzer, and in a preferred embodiment of the invention, 256 such discriminators are provided, one for each of the amplitude gradients desired to be classified and stored in the pulse height analyzer. The amplitude discriminators 12 are each so designed that an output signal occurs from only one discriminator circuit when a pulse is presented to the array of amplitude discriminators.

An array of individual flip-flop circuits 14, which may be termed registers, are connected to the outputs of the array of discriminators 12, and the flip-flop circuits 14 are arranged to be in a flipped condition whenever output signals from their associated discriminators 12 are present at the input to these flip-flop circuits 14. The individual flip-flop circuits 14, after once being flipped, will remain in the flipped condition until they are subsequently flopped. However, as will be seen hereinafter, the flip-flop circuits 14 are not flopped until a record is made in the pulse analyzer circuit indicating that the particular discriminator or discriminators involved have accepted an input signal corresponding to their pre-assigned amplitude range. The flip-flop circuits 14 therefore permanently mark the presence of an incoming pulse and acceptance thereby by the corresponding discriminator 12.

Each of the discriminators 12 is designed to flip the flip-flop circuit 14 associated therewith each time any of the discriminators 12 acepts an input pulse if the flip-flop circuit associated therewith is not already in a flipped condition. It should be readily understandable that the amplitude range for each individual discriminator 12 is distinct from the amplitude range of every other discriminator 12 in the discriminator array. Discriminators adaptable for use in the present invention are known in the art and the details thereof need not be described.

A coincidence circuit 16, which in the illustrated embodiment of the invention is an "and" gate 16, is provided for each channel having associated therewith, a discriminator 12 and a flip-flop circuit 14. The output of each flip-flop circuit 14 is connected to one of the inputs of its associated coincidence circuit 16, while the other input of each coincidence circuit 16 is connected to its associated address decoder gate 18, as will be more clearly seen hereinafter. The outputs of the "and" gates 16 are connected to the flop leads of the flip-flop circuits 14, and whenever any of the "and" gates 16 provide an output signal, the associated flip-flop circuit 14 is flopped.

An address decoder gate 18 is provided for each input channel having associated therewith, a discriminator 12, a flip-flop circuit 14 and a coincidence circuit 16, and as previously stated, the outputs of the address decoder gates 18 are connected to their associated coincidence circuits 16. Each of the address decoder gates 18 provides an output pulse, only when its particular pre-assigned signal code is delivered to it from a provided address scanner circuit 20.

The address scanner circuit 20 in the illustrated embodiment of the invention provides a sequential and repeating binary output signal code series, and the address scanner circuit 20 sequentially steps from one output signal code corresponding to the pre-assigned address of one address decoder gate 18, to the next sequential pre-assigned address of the next sequential address decoder gate 18 and so on until the address scanner circuit 20 has emitted a code or address for each individual address decoder gate 18, and at this point, the process is repeated. In other words, the address scanner circuit 20 puts out a repeating sequential code that is present at the input to every address decoder gate 18 and which is only accepted by one of the address decoder gates 18, at each step in its sequential cycling. Therefore, for each complete cycle of the address scanner circuit 20, each individual address decoder gate 18 puts out one output signal to its associated coincidence circuit 16.

Each address decoder gate 18 can be comprised of a scheme of "and" and "or" gates specifically designed to transmit a signal therethrough, only if the signal corresponds to the preassigned code of the particular address decoder gate 18. Each individual address decoder gate 18 is designed to respond to a different code from the address scanner circuit 20. Such circuits can be designed by those familiar with the art, without difficulty. The address scanner circuit 20 is not restricted to a binary code and a decimal code can be utilized if desired. The address decoder gates 18 would have to be designed to match.

Whenever any of the flip-flop circuits 14 is in a flipped position, and the associated address decoder gate 18 provides an output signal due to the transmission of the particular preassigned address of the address decoder gate 18 from the address scanner circuit 20, the associated coincidence gate 16 opens and a pulse is sent to the associated flip-flop circuit 14 to flop the flip-flop circuit 14 to place the flip-flop circuit 14 in immediate condition to be flipped in the event that an incoming pulse is accepted by its associated discriminator 12. The output pulse from the coincidence circuit 16 is also delivered to the address scanner flip-flop circuit 22 associated with the address scanner circuit 20, and also to the analyzer memory circuit 24 to instruct the analyzer memory circuit 24 to store a count in the memory circuit in the portion thereof reserved for the particular activated coincidence gate 16. A blocking diode 17 is connected to the output of each coincidence circuit 16 and the function thereof is to prevent any output signal from any of the coincidence gates 16 to interfere with the operations of any of the other coincidence gates 16.

The analyzer memory circuit 24 has a count storage area provided for each channel comprising a discriminator 12, a flip-flop circuit 14, a coincidence circuit 16 and an address decoder gate 18. As each address decoder gate 18 is presented with its corresponding code or address by the address scanner circuit 20, the storage area in the analyzer memory circuit 24 corresponding to the channel containing the address decoder gate 18 presented with its code or address is opened and placed in a condition to store a count if the analyzer memory circuit 24 receives an information pulse from the coincidence circuit 16 associated with the particular address decoder gate 18 having its code or address presented to it.

The scanner flip-flop circuit 22, as previously stated, is also connected to the output of the coincidence circuits 16, and a pulse from any of the coincidence circuits 16 will be transmitted to the on terminal of the flip-flop circuit 22 to flip the flip-flop circuit 22, to thereby place an inhibit voltage on the address scanner circuit 20. The presence of an inhibit voltage in the address scanner circuit 20 interrupts the address cycling of the address scanner circuit 20. The output from the flip-flop circuit 22, that is when the flip-flop circuit 22 is flipped, is also transmitted through a delay circuit 26 back to the off terminal of the flip-flop circuit 22 to flop the flip-flop circuit 22, to thereby remove the inhibit voltage from the address scanner circuit 20 and to permit the address scanner circuit 20 to continue its cycling of addresses. The delay circuit 26 is chosen to provide a sufficient time delay to insure that the analyzer memory circuit 24 has sufficient time to record the pulse transmitted thereto from the coincidence gate 16.

The combination of the address scanner flip-flop circuit 22 and the delay circuit 26 illustrated in the drawing has many equivalents, one of which is a monostable multivibrator circuit of a predetermined time delay. As to the specific electrical composition of the address scanner circuit 20 and the analyzer memory circuit 24, it is believed that one skilled in the art can provide working circuits from his background after being informed of the functions desired therefrom.

*Operation*

Initially, all the flip-flop circuits 14 are in a flopped position, and the address scanner circuit 20 is sequentially interrogating the address decoder gates 18 by delivering one address at a time to these gates. The outputs of the open address decoder gates 18 are sequentially transmitted to their associated coincidence circuits 16 but with no effect inasmuch as all the flip-flop circuits 14 are in their flopped condition.

Assume now that a source of input pulses is presented to the input of the pulse height analyzer. The incoming pulses are presented to the array of discriminators 12 over the input line 28 and one, and only one, of the discriminators 12 accepts each incoming pulse. As soon as one of the discriminators 12 accepts an incoming pulse, the associated flip-flop circuit 14 is flipped and an output signal is transmitted to the associated coincidence gate 16. The output signal persists at the coincidence gate circuit 16 until the address decoder gate 18 associated therewith is opened by the sequentially cycling address scanner circuit 20. As soon as the associated address decoder gate 18 is opened due to the reception of its pre-assigned address code from the address scanner circuit 20, a pulse is sent to the coincidence gate 16, resulting in an output pulse from the coincidence gate 16. The output pulse from the coincidence gate 16 flops the associated flip-flop circuit 14, instructs the analyzer memory circuit 24 to record the presence of the coincidence pulse 16, and interrupts the sequential cycling of the address scanner circuit 20. The address scanner circuit 20 is interrupted, or stopped, for a period of time determined by the time delay of the delay circuit 26, and this time delay is long enough to allow the analyzer memory circuit 24 to store the received count from the coincidence circuit 16. After this predetermined time has elapsed, the flip-flop circuit 22 flops and the address scanner circuit 20 re-starts its sequential cycling of addresses for the address decoder gates 18.

Assume for example that two input pulses were presented to the array of discriminators 28 spaced relatively a very short time apart. If the two pulses are of different amplitudes, they are accepted by different discriminators 12 in the discriminator array. Responsive to these pulses, the discriminators permanently mark their associated flip-flop circuit 14. The address scanner circuit 20 sequentially steps from one address to another sequentially opening the address decoder gates 18. The first input pulse to be stored in the analyzer memory circuit 24 is the first pulse channel or the first coincidence gate that the address decoder gates 18 open. As soon as a coincidence gate is opened, the sequential cycling of the address scanner circuit is interrupted, the count corresponding to the open coincidence gate is stored in the analyzer memory circuit, and the associated flip-flop circuit is flopped. After one of the input pulses is analyzed, the address scanner circuit 20 re-starts and the other input pulse is analyzed. It is therefore apparent that the second input pulse to be presented to the pulse height analyzer could be the first pulse analyzed. This could be true with respect to the second and third received input pulses and so forth.

Therefore, it can be seen that the pulse height analyzer disclosed immediately marks the presence of incoming pulses and then begins to analyze the pulses one by one. Therefore, such a pulse height analyzer can accept bursts of signals and mark the reception of these signals extremely fast and then at a slower rate record these pulses in the analyzer memory circuit 24.

It can be seen, however, that if two pulses of the same amplitude range are presented to the discriminator array within the time that it takes to store the first received pulse in the analyzer memory circuit 24, then the second pulse will not be recorded. However, the likelihood of this occurring and the consequent error is not significant compared with the savings in complex circuitry provided by this new and improved pulse height analyzer.

In order to reduce the possibility of loss of information as when two or more pulses of the same amplitude range are presented to the discriminator array within the time that it takes to store the first received pulse, variations upon the disclosed embodiment of the invention can be made. A "scale of two" circuit or a "scale of four" circuit and so forth can be introduced into each channel between each discriminator 12 and its associated flip-flop circuit 14. These "scale of two" circuits and so on count the number of pulses passed by its associated discriminator 12 and stores this count and then delivers one-half as many, or one-fourth as many pulses to its associated flip-flop circuit 14 as counts it receives depending upon if a scale of two or four is used. However, these output pulses are only available one at a time and only when its associated flip-flop circuit 14 is flopped. Circuits of this type can be readily provided by those skilled in the art. Scale of eight or more circuits may also be used. When utilizing a scaling circuit preceding the flip-flop 14 in each channel, the operator is aware that counts recorded in the memory represent 2, 4, 8 or more times the number of counts actually received from the corresponding discriminators, depending upon the scale factor used.

It is obvious, furthermore, that the discriminators 12 may be replaced by independent sources of signal pulses, such as signals from separate radiation detectors, and that the same principles of operation would apply as in this embodiment in which the record counts are received from pulse amplitude discriminators.

What has been described is what is believed to be the preferred embodiment of the invention. However, modifications, alterations and the like may be made without departing from the true spirit and scope of the invention, and it is the purpose of the following appended claims to cover all such modifications and alterations.

What is claimed in the application for United States Letters Patent is:

1. In a multi-channel pulse height analyzer for sorting input pulses by amplitude,
   a plurality of channels, each including:
   an input gate circuit providing an output signal only when an input pulse is within a predetermined amplitude range,
   a register circuit connected to said input gate circuit, an output signal from said gate circuit placing said register circuit in a condition to indicate the reception of an input pulse within the predetermined amplitude range,
   and a coincidence circuit connected to said register circuit,
   a permanent storage circuit for counting the number of pulses received in each channel, said permanent storage circuit being connected to the output of each coincidence circuit,
   and an address scanner providing a plurality of coded output signals, one for each channel, said address scanner being connected to said permanent storage circuit and to each of said coincidence circuits, the application of a coded output signal from the address scanner to the permanent storage circuit and to a coincidence circuit, whose corresponding register circuit indicates the reception of an input pulse within the predetermined amplitude range, causing said coincidence circuit to provide an output signal to the permanent storage circuit.

2. The structure of claim 1 further characterized in that the output of each coincidence circuit is connected back to its corresponding register circuit, an output signal from a coincidence circuit placing its corresponding register circuit in a condition to indicate the reception of the next input pulse within the predetermined amplitude range.

3. The structure of claim 1 further characterized in that said address scanner provides a plurality of coded output signals in a predetermined sequence.

4. The structure of claim 1 further characterized in that each of said register circuits includes a bistable multivibrator placed in one stable condition by the receipt of a signal from its corresponding gate circuit and placed in the other stable condition by the receipt of a signal from its corresponding coincidence circuit.

5. The structure of claim 1 further characterized by circuit means connected to said address scanner for delaying the application of said coded output signals during the period that a coincidence circuit is applying an output signal to the permanent storage circuit.

6. In a multi-channel pulse height analyzer for sorting input pulses by amplitude,
a plurailty of channels, each including:
  an input gate circuit providing an output signal only when an input pulse is within a predetermined amplitude range,
  a bistable multivibrator connected to said input gate circuit, an output signal from said gate circuit placing said bistable multivibrator in one stable condition to indicate the reception of an input pulse within the predetermined amplitude range,
  and a coincidence circuit, the input of which is connected to one side of said bistable multivibrator and the output of which is connected to the other of the bistable multivibrator,
a permanent storage circuit for counting the number of pulses received in each channel, said permanent storage circuit being connected to the output of each coincidence circuit,
and an address scanner providing a plurality of coded output signals in a predetermined sequence, there being a coded output signal for each channel, said address scanner being connected to said permanent storage circuit and to each of said coincidence circuits, the application of a coded output signal from the address scanner to the permanent storage circuit and to a coincidence circuit whose corresponding bistable multivibrator indicates the reception of an input pulse within the predetermined amplitude range, causing said coincidence circuit to provide an output signal to the permanent storage circuit and to its corresponding bistable multivibrator to place said bistable multivibrator in a condition to indicate the reception of the next input pulse within the predetermined amplitude range.

7. A method of classifying input pulses by amplitude and of counting the pulses classified in each of a multitude of predetermined amplitude ranges, including the steps of placing a register circuit in a condition to indicate when a pulse is received within a predetermined amplitude range, there being a multitude of register circuits, one for each amplitude range, sequentially electrically energizing each register circuit and recording a count in the channel of a multichannel memory corresponding to a particular register circuit if that register circuit has been placed in a condition indicating the reception of a pulse within a predetermined amplitude range, the electrical energization of a register circuit being effective to place said circuit in a condition to indicate the receipt of the next pulse within that predetermined amplitude range, and delaying said sequential electrical energization upon reaching a register circuit in a condition indicating the receipt of a pulse within a predetermined amplitude range, a sufficient period of time to complete recording in the memory channel.

References Cited in the file of this patent

UNITED STATES PATENTS

| 2,745,985 | Lewis | May 15, 1956 |
| 2,927,207 | Fiehrer | Mar. 1, 1960 |
| 3,050,713 | Harmon | Aug. 21, 1962 |
| 3,054,960 | Pearlman | Sept. 18, 1962 |

FOREIGN PATENTS

| 1,082,939 | Germany | June 9, 1960 |